(12) United States Patent
Ito et al.

(10) Patent No.: US 7,752,273 B2
(45) Date of Patent: Jul. 6, 2010

(54) GROUP COMMUNICATION SYSTEM BASED ON PRESENCE INFORMATION AND CLIENT DEVICE

(75) Inventors: Naoko Ito, Tokyo (JP); Masafumi Watanabe, Tokyo (JP); Natsuko Tsutazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1410 days.

(21) Appl. No.: 11/087,672

(22) Filed: Mar. 24, 2005

(65) Prior Publication Data

US 2005/0216565 A1  Sep. 29, 2005

(30) Foreign Application Priority Data

Mar. 25, 2004  (JP) ............................. 2004-088310

(51) Int. Cl.
  *G06F 15/16* (2006.01)
(52) U.S. Cl. .................................................... 709/206
(58) Field of Classification Search ................. 709/203, 709/204, 227, 220, 224; 370/229
  See application file for complete search history.

(56) References Cited

U.S. PATENT DOCUMENTS

| | | | | |
|---|---|---|---|---|
| 6,757,722 B2* | 6/2004 | Lonnfors et al. | ............ | 709/220 |
| 7,412,522 B2* | 8/2008 | Liscano et al. | .............. | 709/227 |
| 7,493,390 B2* | 2/2009 | Bobde et al. | ................ | 709/224 |
| 2004/0003037 A1* | 1/2004 | Fujimoto et al. | ............ | 709/203 |
| 2004/0133641 A1* | 7/2004 | McKinnon et al. | .......... | 709/204 |
| 2004/0153506 A1* | 8/2004 | Ito et al. | ..................... | 709/204 |
| 2005/0135240 A1* | 6/2005 | Ozugur | ....................... | 370/229 |
| 2005/0262198 A1* | 11/2005 | Leppanen et al. | ........... | 709/204 |
| 2008/0244026 A1* | 10/2008 | Holt et al. | .................... | 709/206 |

FOREIGN PATENT DOCUMENTS

| | | | |
|---|---|---|---|
| JP | P2002-183064 A | | 6/2002 |
| WO | 03/085556 A1 | | 10/2003 |

OTHER PUBLICATIONS

M. Day et al., "A Model for Presence and Instant Messages", Request for Comments: 2778, Feb. 2000, pp. 1-16, The Internet Society.

* cited by examiner

*Primary Examiner*—Dustin Nguyen
(74) *Attorney, Agent, or Firm*—Sughrue Mion, PLLC

(57) ABSTRACT

When the status of a client X is changed to a status i, a group management unit generates a group agent Xi, corresponding to the status i and registers the generated group agent in the server S, and the presence issuing unit issues the status i and the identifier of the group agent Xi. Initially, a member management unit of the group agent xi manages the client X only. When other clients, such as clients B and C, that are observing the status of the client X send an instant message (IM) to the group agent Xi identified by the issued identifier, an IM delivery unit of the group agent Xi adds the clients B and C, which are IM senders, to the members managed by the member management unit and sends the IM to all members.

24 Claims, 11 Drawing Sheets

FIG. 6a

```
<presence entity="sip:someone@example.com">
<tuple id="7c8dqui">
 <status>
  <basic>open</basic>
  <es:extension>Feeling Good</es:extension>
 </status>
 <contact>sip:adhocFeelingGood@example.com</contact>
</tuple>
</presence>
```

FIG. 6b

| PRESENCE STATUS | GROUP AGENT IDENTIFIER |
|---|---|
| Feeling Good | sip:adhocFeelingGood@example.com |
| Feeling Bad | sip:adhocFeelingBad@example.com |

FIG. 7

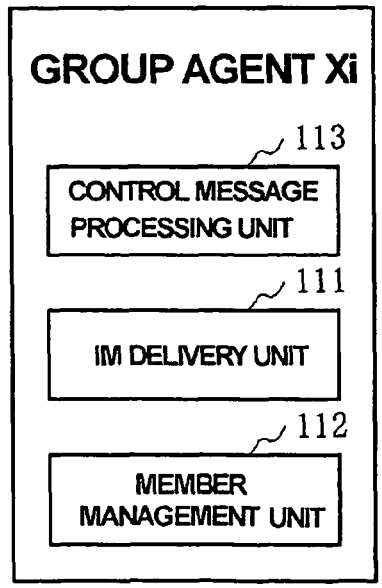

| PRESENCE STATUS | ADDRESS TO BE NOTIFIED | GROUP GENERATION |
|---|---|---|
| Feeling Good | sip:adhocFeelingGood@example.com | YES |
| Feeling Bad | sip:someone@example.com | NO |

GROUP COMMUNICATION SYSTEM BASED ON PRESENCE INFORMATION AND CLIENT DEVICE

FIELD OF THE INVENTION

The present invention relates to a communication method for sending and receiving an instant message among a plurality of client devices via a network, and more particularly to a group communication method for dividing the plurality of client devices into groups, based on presence information, for sending and receiving an instant message among members belonging to a group.

BACKGROUND OF THE INVENTION

An instant message and presence service system (hereinafter called an IM&P service system) refers to a system in general that delivers an instant message (hereinafter called an IM) and manages the status of the users. The basic architecture is defined by RFC 2778 (Request for Comments: 2778).

A presence system comprises a presentity that presents its own presence information, a watcher that observes the presence information, and a presence service that receives presence information from the presentity and delivers it to the watcher. A watcher can request the presence service to send a notification when the presence information on some presentity changes.

Combining a presence system, which provides user status information, with an instant message system allows communication to be made considering the status of the other party. (See Patent Document 1)

There are two types of IM&P service systems: one type is implemented as a client-server system, and the other type as a peer-to-peer system in which client terminals are interconnected. In the former type of system, one or more servers are interconnected with client terminals for communication via a network, such as the Internet, to receive presence information from presentities of client terminals, deliver the information to the watches of other client terminals and, at the same time, relay the delivery of instant messages among client terminals. In the latter type of system, the functions of a server in the client server system are installed on client terminals. Although the present invention is applicable to both systems, the following describes an example in which the IM&P service system is implemented as a client server system, for convenience of description.

[Patent Document 1]
Japanese Patent Kokai Publication JP-P2002-183064A

The conventional IM&P service system provides the instant message service basically as a messaging service between two users. Therefore, when a plurality of watchers check the status of one presentity and send an IM to that presentity, the communication between the presentity and each watcher is performed independently. This requires the presentity to interact with the plurality of watchers separately.

Even if the group interaction (chat) function is available, the procedure must be executed to "invite" each participant before starting the group interaction as described in Patent Document 1. That is, even when there are a plurality of watchers having an interest in the particular status of a presentity, there is no means for dynamically grouping the watchers.

In addition, for a user to participate in a group, he or she must be invited by some other user already participating in the group. Therefore, neither a user has a chance to know that there is such a group nor can the user participate in the group voluntarily.

SUMMARY OF THE DISCLOSURE

In view of the foregoing, it is an object of the present invention to provide means for automatically dividing the users of an IM&P service system into groups based on presence information and for allowing the members of a group to execute broadcasting, that is, a chat, among them.

A group communication system based on presence information according to one aspect of the present invention is for use in an instant message and presence service system that sends and receives presence information and an instant message among a plurality of client devices each comprising a presentity that provides presence information; a watcher that observes presence information on presentities other than the presentity; and an IM (Instant Message) transmission/reception unit that sends and receives an instant message, wherein at least one of the plurality of client devices comprises a group management unit that, when presence information provided by the presentity of this client device changes to a specific status, generates a group agent device corresponding to the status; and a presence issuing unit that issues the specific status and an identifier used to contact the generated group agent device and the group agent device comprises a member management unit that manages, as members thereof, the client device that generated this group agent device and a client device that sends an instant message to this group agent device; and an IM delivery unit that transfers an instant message, which is sent to this group agent device, to all client devices that are members managed by the member management unit except at least the sender of the instant message.

In the group communication system based on presence information according to the one aspect of the present invention, when presence information provided by the presentity of at least one of the plurality of client devices changes to a specific status, the group management unit of the client device generates a group agent device corresponding to the status, and a presence issuing unit issues the specific status and an identifier used to contact the generated group agent device. This allows the users of other client devices, who are monitoring the status of the client device, to recognize that the client device has changed to a specific status and, at the same time, to know the identifier used to contact a group agent device corresponding to the recognized status. When the user of some other client device sends an instant message to the group agent device, the member management unit of the group agent device manages, as members thereof, the client device that generated this group agent device as well as the client device that sends the instant message to this group agent device, and an IM delivery unit transfers the instant message to all client devices that are members managed by the member management unit except at least the sender of the instant message.

A second group communication system based on presence information according to the second aspect of the present invention is for use in an instant message and presence service system that sends and receives presence information and an instant message among a plurality of client devices each comprising a presentity that provides presence information; a watcher that observes presence information on presentities other than the presentity; and an IM transmission/reception unit that sends and receives an instant message, wherein the client device comprises a group management unit that, when presence information provided by the presentity of this client device changes to a specific status, generates a group corresponding to the status; and a presence issuing unit that issues the specific status and an identifier used to contact the generated group and the group management unit comprises a member management unit that manages, as members thereof, the client device that generated the group and a client device that sends an instant message to the group and, at the same time, synchronizes all members and a member list; and an IM delivery unit that transfers an instant message, which is sent to this group, to all client devices that are members managed by the member management unit except at least the sender of the instant message.

In the group communication system based on presence information according to the second aspect of the present invention, when presence information provided by the presentity of a client device changes to a specific status, the group management unit of the client device generates a group corresponding to the status, and the presence issuing unit issues the specific status and an identifier used to contact the generated group. This allows the users of other client devices, who are monitoring the status of the client device, to recognize that the client device has changed to a specific status and, at the same time, to know the identifier used to contact the group corresponding to the recognized status. When the user of some other client device sends an instant message to the group, the member management unit of the client device manages, as members thereof, the client device that generated this group as well as the client device from which the instant message was received and, at the same time, synchronizes all members and a member list, and the IM delivery unit transfers the instant message to all client devices that are members managed by the member management unit except at least the sender of the instant message.

A group communication system based on presence information according to the third aspect of the present invention is for use in an instant message and presence service system that sends and receives presence information and an instant message among a plurality of client devices each comprising a presentity that provides presence information; a watcher that observes presence information on presentities other than the presentity; and an IM transmission/reception unit that sends and receives an instant message, wherein each of the plurality of client devices further comprises a group management unit that, when presence information provided by the presentity of this client device changes to a specific status, generates a group agent device corresponding to the specific status if there is no other client, observed by the watcher of this client device, that has the same status but, if there is some other client that has the same status, sends a control command to a group agent device, generated corresponding to the same status, to request that this client be added to members of the group; and a presence issuing unit that issues the specific status and an identifier used to contact the generated group agent device and the group agent device comprises a member management unit that manages, as members thereof, the client device that generated this group agent device and a client device that sends the control command to this group agent device; and an IM delivery unit that transfers an instant message, which is sent to this group agent device, to all client devices that are members managed by the member management unit except at least the sender of the instant message.

In the group communication system based on presence information according to the third aspect of the present invention, when presence information provided by the presentity of a client device changes to a specific status, the group management unit generates a group agent device corresponding to the specific status if there is no other client, observed by the watcher of this client device, that has the same status, and the presence issuing unit issues the specific status and an identifier used to contact the generated group agent device. If there is some other client that has the same status, the group management unit sends a control command to a group agent device, generated corresponding to the same status, to request that this client be added to members of the group. The member management unit of the group agent device manages, as members thereof, the client device that generated this group agent device and a client device that sends the control command to this group agent device. This method groups a plurality of clients, whose presentity status is the same, into one and, when one client device of the members sends an instant message to the group agent device, the IM delivery unit of the group agent device transfers the received instant message to all client devices that are members managed by the member management unit except at least the sender of the instant message.

The meritorious effects of the present invention are summarized as follows.

The present invention provides means for automatically dividing the users of an IM&P service system into groups based on presence information and for allowing the members of a group to execute broadcasting among them.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 6a and 6b are diagrams showing an actual example in the first embodiment of the present invention.

FIG. 7 is a diagram showing a variation of the first embodiment of the present invention.

PREFERRED EMBODIMENTS OF THE INVENTION

Preferred embodiments of the present invention will be described with reference to the accompanying drawings.

First Embodiment

Figure 1:
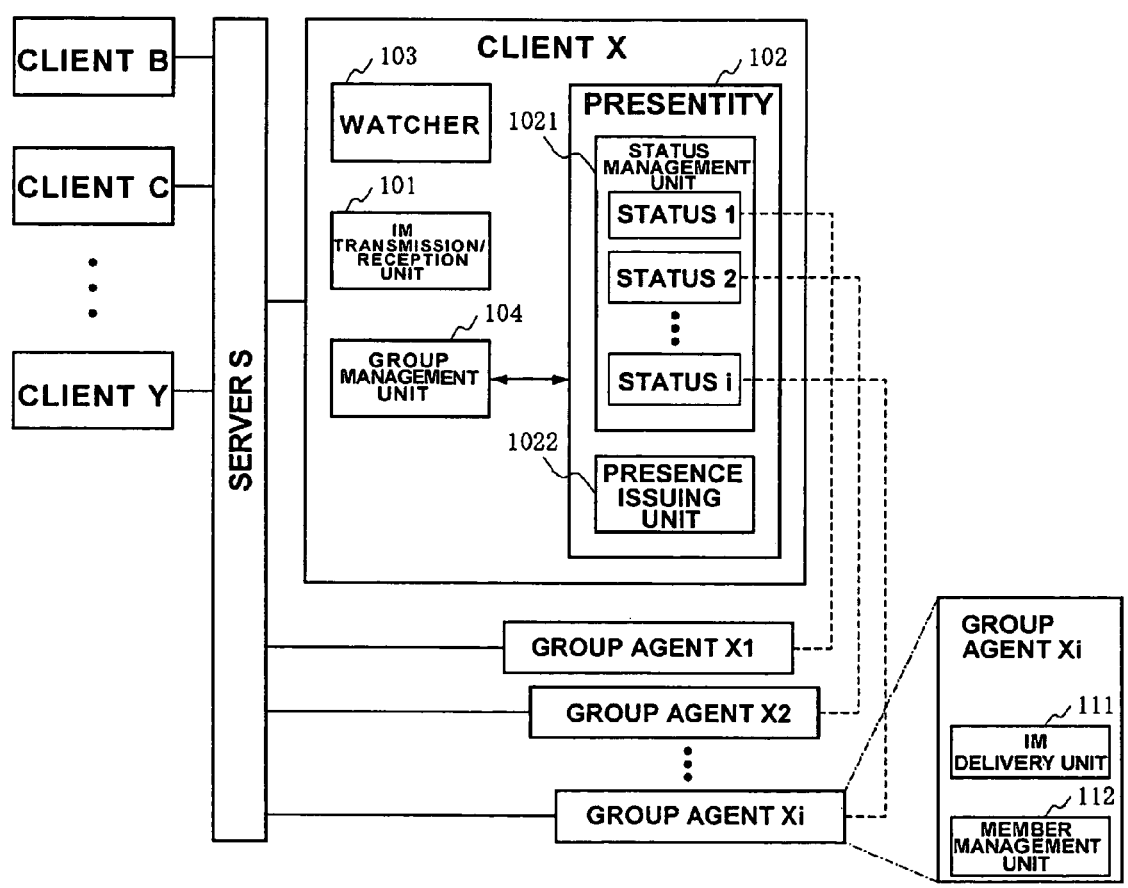
FIG. 1 is a block diagram showing the general configuration of a first embodiment of the present invention.

Referring to FIG. 1, a first embodiment of the present invention comprises a server S that operates as a server in an IM&P service system; and a client X, group agents X1-Xi, and clients B, C, . . . , Y each of which operates as a user agent of the IM&P service system. The server S and each of the user agents are interconnected via a network such as the Internet, not shown, for communication between them.

The client X comprises an IM transmission/reception unit 101, a presentity 102, a watcher 103, and a group management unit 104. The IM transmission/reception unit 101, the presentity 102, and the watcher 103 each have functions necessary for a user agent of the IM&P service system. The presentity 102 has a status management unit 1021 and a presence issuing unit 1022.

The group management unit 104 monitors the status of the presentity 102 and, upon detecting that the status is changed, registers a group agent, corresponding to the changed status, into the server S as a user agent of the IM&P service system. The group agents X1, X2, . . . , Xi in FIG. 1, which are registered in this way, correspond one-to-one to status 1, status 2, . . . , and status i.

The group agent Xi comprises an IM delivery unit 111 and a member management unit 112. The member management unit 112 manages the members belonging to the group Xi. In response to an IM addressed to the group Xi, the IM delivery unit 111 adds the IM sender to the member management unit 112 as one member and, at the same time, sends the received IM to all members managed by the member management unit 112. Other group agents X1, X2, and so on also have the same configuration as that of the group agent Xi. The group agents X1, X2, . . . , Xi may be physically located in the terminal in which the client X is located or in some other terminal in the IM&P service system.

The other clients B, C, . . . , Y need not have the same configuration as that of the client X as long as they have the watcher function that monitors the status of the client X and the IM sending/receiving function.

The server S, the server of the IM&P service system, has the function to deliver an IM between user agents and a function to notify presence information. Because group agents X1, X2, . . . , Xi, each of which has the IM delivery unit 111, are also user agents, the server S subtracts the network address (for example, an IP address) of a group agent from the group agent identifier (for example, a sip address) to deliver a message to the group agent. The server S is not always configured physically by one server; in some cases, the server S also includes a plurality of servers such as a server for resolving the address relation between a group agent identifier and a network address and a server for providing the presence service.

Figure 2:
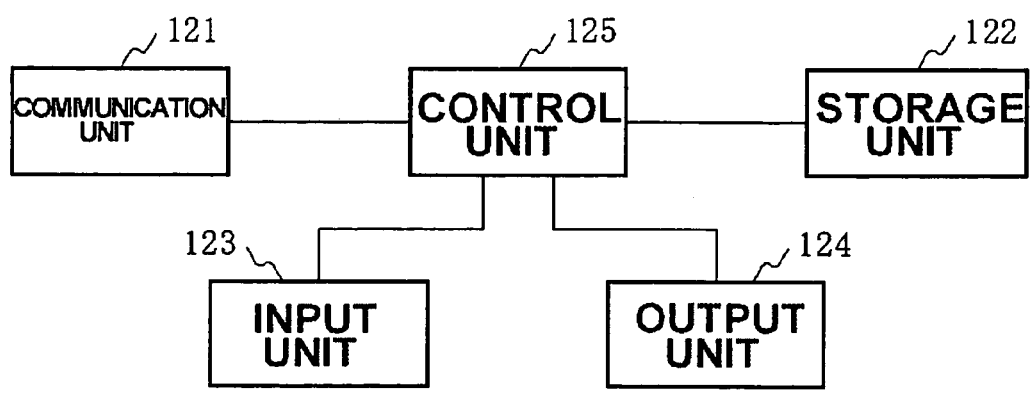
FIG. 2 is a block diagram showing an example of the hardware configuration of a client.

Referring to FIG. 2, an example of the hardware configuration of the client X comprises a communication unit 121 that communicates various types of data with the server S, a storage unit 122 such as a magnetic disk for storing various types of data and programs, an input unit 123 such as a keyboard from which the user enters various types of data, an output unit 124 such as an LCD (Liquid Crystal Device) from which various types of data is output, and a control unit 125 such as a CPU for controlling the components. Each functional unit of the client X in FIG. 1, that is, the IM transmission/reception unit 101, the presentity 102, the watcher 103, and the group management unit 104, is implemented by the CPU constituting the control unit 125 and the programs stored in the storage unit 122. When the group agents X1, X2, . . . , Xi are created in the same hardware as that of the client X, each of the group agents X1, X2, . . . , Xi also comprises the CPU constituting the control unit 125 and the programs stored in the storage unit 122. The other clients B, C, . . . , Y can also have the same hardware configuration as that of the client X.

Figure 3:
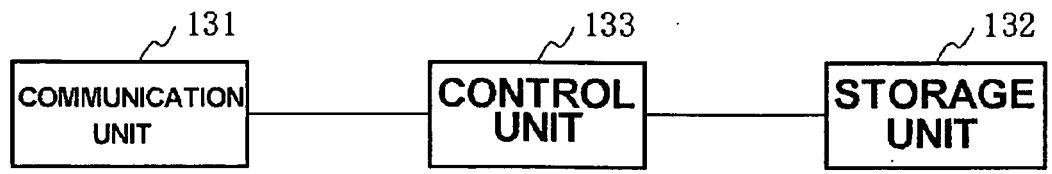
FIG. 3 is a block diagram showing an example of the hardware configuration of a server.

Referring to FIG. 3, an example of the hardware configuration of the server S comprises a communication unit 131 that communicates various types of data with the user agents, a storage unit 132 such as a magnetic disk for storing various types of data and programs, and a control unit 133 such as a CPU for controlling the components. The functions of the server S are implemented by the CPU constituting the control unit 133 and the programs stored in the storage unit 132.

Figure 4:
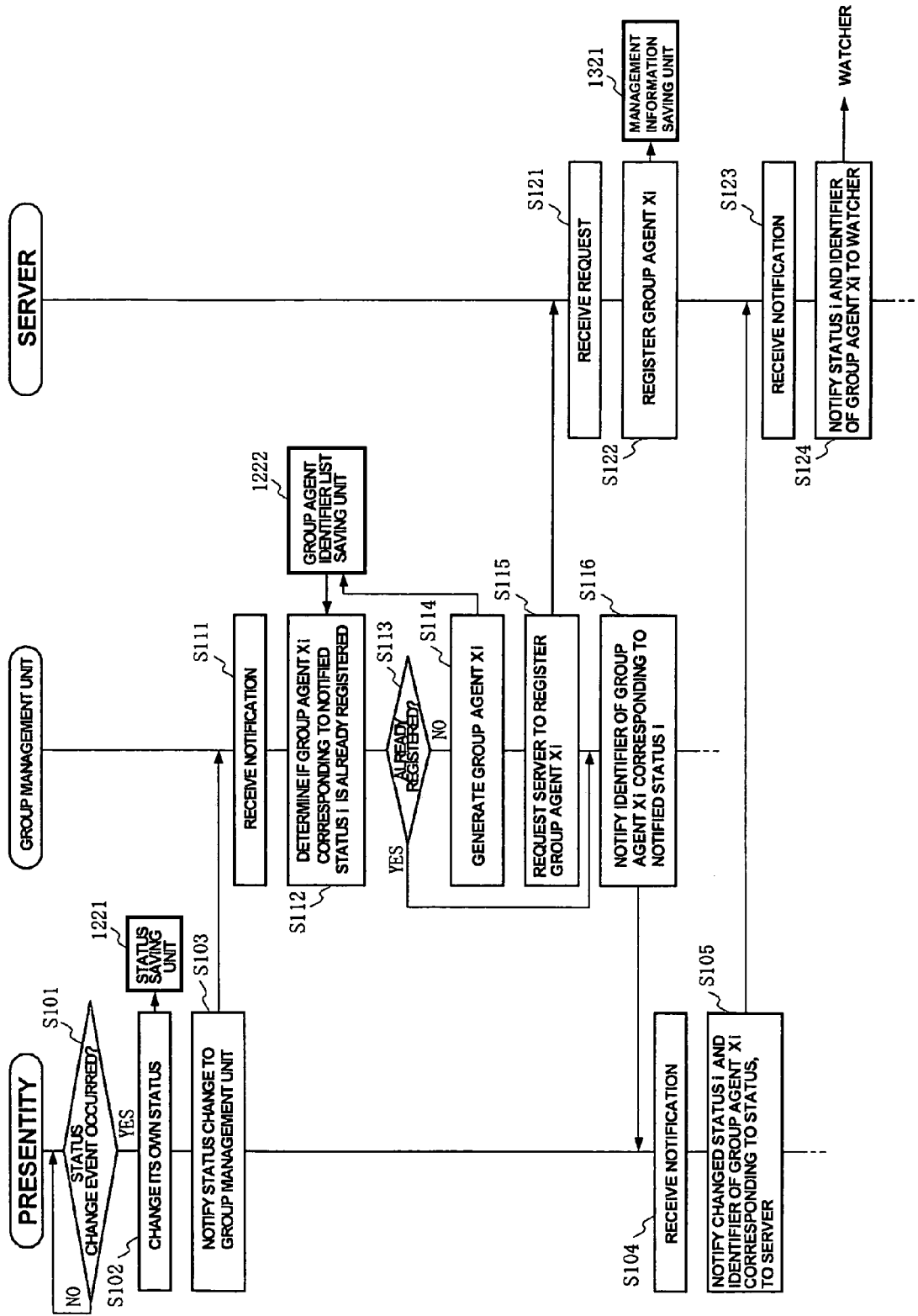
FIG. 4 is a flowchart showing an example of processing of the components in the first embodiment of the present invention.
Figure 5:
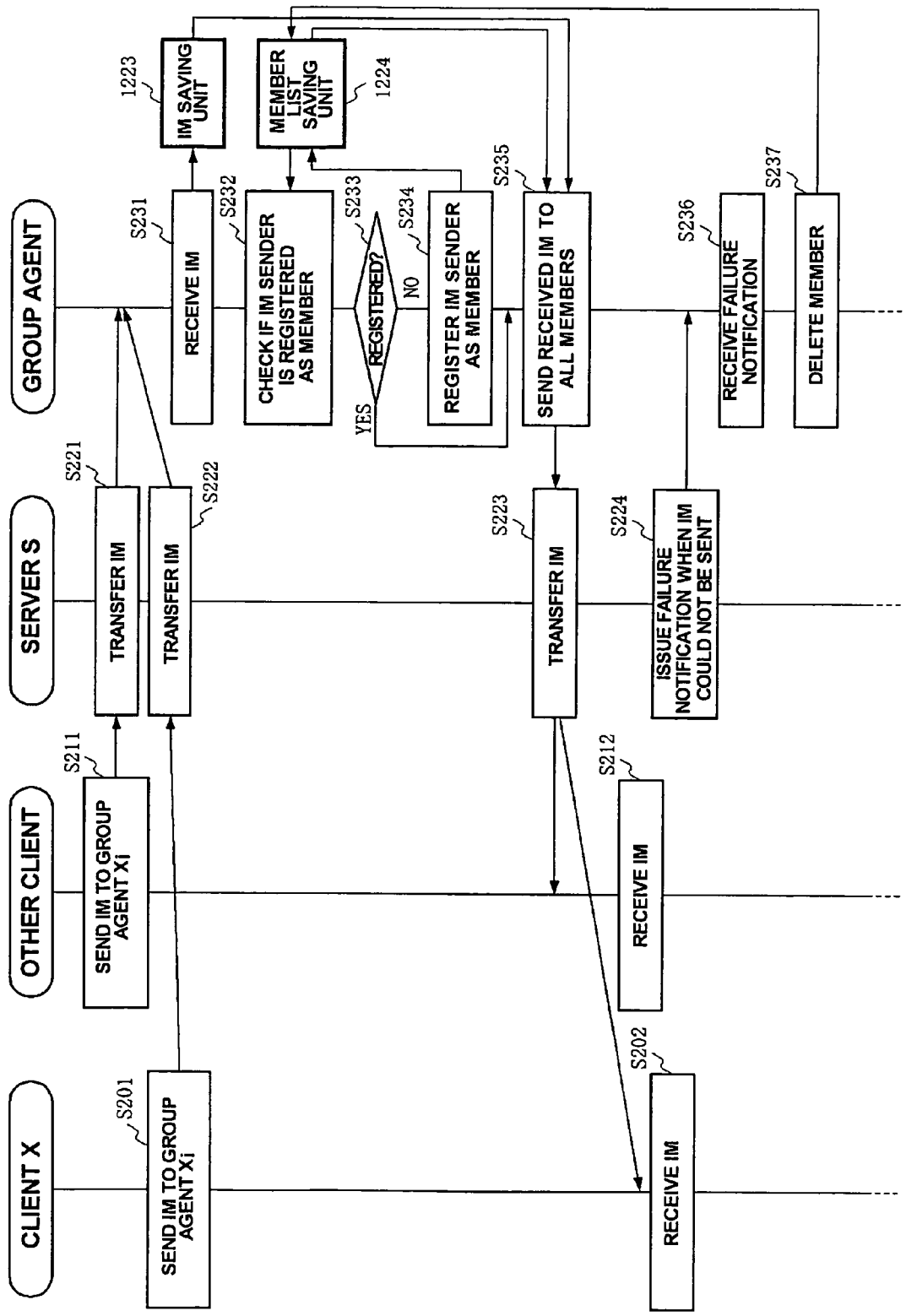
FIG. 5 is a flowchart showing an example of processing of the components in the first embodiment of the present invention.

FIGS. 4 and 5 are flowcharts showing an example of processing of the components in this embodiment. Referring to FIG. 4, the presentity 102 of the client X determines if a status change event occurred (S101) and, if such an event occurred, updates a status saving unit 1221, provided in the storage unit 122, for saving its current status in the status saving unit 1221 (S102). An example of status change events is a status change request entered by the user of the client X from the input unit 123. The presentity 102 sends a status change notification, which includes the changed status, to the group management unit 104 (S103).

In response to the status change notification from the presentity 102 (S111), the group management unit 104 references a group agent identifier list saving unit 1222 in the storage unit 122, in which the list of registered group agent identifiers is saved, to determine if the group agent corresponding to the changed status is already registered (S112). If not (NO in S113), the group management unit 104 generates a group agent corresponding to the changed status and saves the identifier of the generated group agent into the group agent identifier list saving unit 1222 (S114). Then, the group management unit 104 connects to the server S via the communication unit 121 and sends a group agent registration request to the server S (S115). This group agent registration request includes the generated group agent identifier (for example, a sip address) and a group agent network communication address (for example, an IP address) dynamically allocated to the identifier.

In response to the group agent registration request including the group agent identifier and the communication address (S121), the server S registers the correspondence between the group agent identifier and the communication address into a management information saving unit 1321 provided in the storage unit 132 (S122). The management information saving unit 1321 contains the correspondence between the identifiers and the communication addresses of the already registered user agents such as clients X and clients B, C, . . . , Y.

If the group agent corresponding to the changed status is already registered (YES in S113) or after the group agent not yet registered is newly registered (S115), the group management unit 104 notifies the group agent identifier, corresponding to the changed status, to the presentity 102 (S116). In response to this notification (S104), the presentity 102 notifies the changed status and the group agent identifier, corresponding to the changed status, to the server S as presence information (S105).

In response to the changed status and the group agent identifier, corresponding to the status, from the presentity 102 of the client X (S123), the server S notifies the received changed status of the presentity 102 and the group agent identifier, corresponding to the status, to the watchers of the clients that are monitoring the presence of the client X (S124).

Referring to FIG. 5, when an IM whose destination is the identifier of a group agent is sent from some other client such as the client X or the client B (S201, S211), the IM is transferred by the server S to the group agent having the communication address corresponding to the group agent identifier (S221, S222).

The group agent uses the IM delivery unit 111 to save the received IM into an IM saving unit 1223 in the storage unit 122 (S231) and uses the member management unit 112 to reference a member list saving unit 1224 in the storage unit 122, in which the member list is saved, for checking if the IM sender is registered as a member (S232). If the IM sender is not yet registered as a member (NO in S233), the member management unit 112 registers the IM sender in the member list saving unit 1224 (S234).

Next, if the IM sender is already registered as a member (YES in S233) or after the IM sender who is not registered is registered as a new member (S234), the group agent uses the IM delivery unit 111 to reference the member list saving unit 1224 and sends the received IM to all members (S235). At this time, it is possible not to send the received IM to the IM sender.

The IM sent from the group agent is relayed by the server S (S233) and is received by the client X or other client that is the destination of the IM (S202, S212). If any of the clients is offline and thus the IM could not be sent, the server S sends a failure notification, including information on the client to which the IM could not be sent, to the group agent that is the sender (S224).

Upon receiving this failure notification (S236), the group agent uses the member management unit 112 to delete the information on the client, to which the IM could not be sent, from the member list saving unit 1224 to remove the client from the members of the group (S237).

With reference to FIG. 1 to FIG. 5, the following describes the operation of this embodiment.

(1) Suppose that the presentity 102 of the client X changed its status stored in the status management unit 1021 (S102).

(2) The group management unit 104 of the client X generates a group agent, corresponding to the changed status of the presentity 102, and registers the generated group agent into the server S of the IM&P service system (S114, S115, and S122). This group agent has a group agent identifier that is unique in the presence service.

(3) On the other hand, the presence issuing unit 1022 of the presentity of the client X combines the status, which is stored in the status management unit 1021, with the group agent identifier, which is determined by the group management unit 104, and issues the combined information to the server S of the presence service (S105).

(4) Upon receiving this information, the watcher of a client monitoring the status of the client X receives the status of the client X and the identifier of the corresponding group agent Xi via the server S (S124).

(5) Next, suppose that the client Y, which received the status of the client X and the identifier of the group agent Xi, sends an IM to the group agent Xi identified by the group agent identifier (S211).

(6) Upon receiving this IM via the server S, the group agent Xi registers the sender Y of the IM as a member managed by the member management unit 112 (S234).

(7) Next, the group agent Xi delivers the received IM to all members (S235). In this case, the sender Y may or may not be included in the delivery destinations. The sender of the IM is now the group agent Xi.

(8) If the IM could not be sent to some client, the group agent Xi deletes the client from the members stored in the member management unit 112.

(9) Steps (5) to (8) are repeated. If the client Y withdraws from the instant message and presence service during the steps, the client Y is deleted from the members of the group agent Xi in step (8).

(10) The group agent Xi stays in the IM&P service system until it is deleted. The group agent Xi is explicitly deleted by an authorized user.

Because the presentity 102 can have a plurality of statuses at the same time, a plurality of group agents may be generated, one for each status.

Because the presentity 102 can have a plurality of statuses at the same time, a group agent may be generated for a combination of statuses.

The following describes the operation using an actual example. In the following description, suppose that the client B and the client C are operating as watchers monitoring the status of the client X.

(1) Suppose that the presentity 102 of the client X, which has an identifier sip:someone@example.com in the IM&P service system, changed its status in the status management unit 1021 from "Feeling Bad" to "Feeling Good".

(2) The group management unit 104 of the client X registers a group agent, corresponding to the status of the presentity 102 "Feeing Good", in the IM&P service system. Suppose that this group agent is identified in the presence service as an identifier sip:adhocFeelingGood@example.com. The client X is registered in the member management unit 112 as a member.

(3) The presence issuing unit 1022 of the presentity 102 of the client X combines the status stored in the status management unit 1021 with the identifier of the group agent determined by the group management unit 104 and issues the combined information to the presence service. A description example, conforming to the CPIM (Common Presence and Instant Messaging) format now being standardized by the IETF (Internet Engineering Task Force), is shown in FIG. 6a. The correspondence between presence statuses and group agent identifiers is shown in FIG. 6b.

(4) The client B and the client C, which are monitoring the status of the client X, receive the status "Feeling Good" of the client X and its corresponding group agent identifier sip:adhocFeelingGood@example.com via the server S.

(5) Suppose that the client B sends an IM to the group agent Xi identified by the group agent identifier sip:adhocFeelingGood@example.com.

(6) Upon receiving this IM via the server S, the group agent Xi registers the sender B of the IM as a member managed by the member management unit 112.

(7) The group agent Xi delivers the IM, received from the client B, to the client X and the client B which are members managed by the member management unit 112.

(8) Next, suppose that the client C sends an IM to the group agent Xi identified by the group agent identifier sip: adhocFeelingGood@example.com.

(9) Upon receiving this IM via the server S, the group agent Xi registers the sender C of the IM as a member managed by the member management unit 112.

(10) The group agent Xi delivers the IM, received from the client C, to the client X, the client B, and the client C which are members managed by the member management unit 112.

(11) Suppose that the client B has finished using the instant message and presence service.

(12) After that, suppose that the client X sends an IM to the group agent Xi identified by the group agent identifier sip: adhocFeelingGood@example.com.

(13) The group agent Xi delivers an IM, received from the client X, to the client X, client B, and client C which are members managed by the member management unit 112.

(14) The group agent Xi receives a failure notification, indicating that the IM could not be sent to the client B, from the server S of the IM&P service system.

(15) The group agent Xi deletes the client B, to which the IM could not be sent, from the members managed by the member management unit 112.

(16) When the client X deletes the group agent Xi from the IM&P service system, the group is terminated.

As described above, a group composed of members with a common topic can be created easily in this embodiment. The reason is that a group of members having an interest in a specific topic, which is issued by the presentity 102 of the client X, is generated by allowing a watcher having an interest in the specific status to send an IM in response to that status and then including the watcher into the group.

In addition, a user not participating in a group can participate voluntarily into that group. The reason is that, if a user watches the status of the presentity 102 and a specific status is caused, information on the status and the identifier of the group agent are sent to notify the user about that group. Therefore, the user can indicate the intention to participate into the group even if an invitation is not received from a user already participating in that group.

Next, some variations of the first embodiment of the present invention will be described.

(First variation): As shown in FIG. 7, it is possible to provide a control message processing unit 113 in each group agent that, in response to a specific control command, deletes a user agent, who is the sender of the command, from the member list managed by the member management unit 112. In this configuration, when the client Y belonging to a group sends an IM (control message), which includes a control command, to the group agent Xi, the control message processing unit 113 of the group agent Xi interprets the control command and deletes the information on the client Y from the member list saving unit 1224 to delete the client Y from the members registered in the member management unit 112. The control message may be sent either explicitly by the user or automatically when the user changes the status of the client Y or the client Y withdraws from the presence service.

Figures 8, 9:
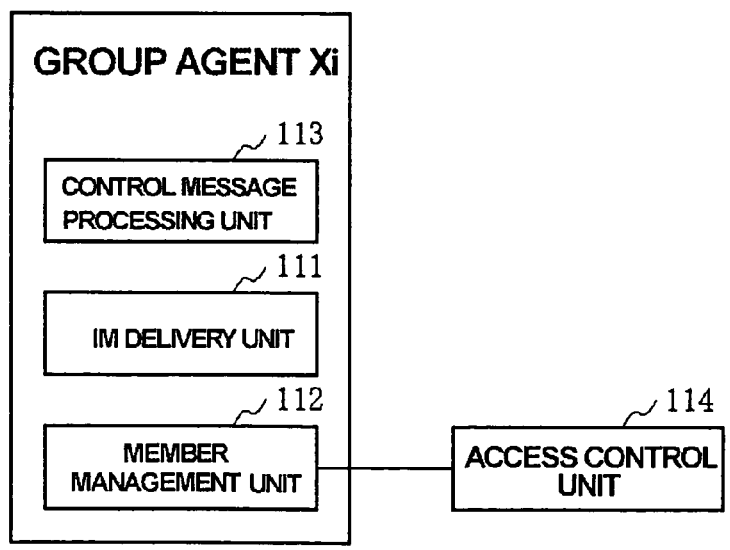
FIG. 8 is a diagram showing another variation of the first embodiment of the present invention.
FIG. 9 is a diagram showing a still another variation of the first embodiment of the present invention.

(Second variation): Some status, such as "want to be alone", is not suitable as a trigger for generating a group. In this case, a group agent is not registered as a user agent of the IM&P service system in this variation even if the status is changed. For example, when there are two types of status of the client X, that is, "Feeling Good" and "Feeing Bad", and if the user wants to generate a group for "Feeling Good" but not for "Feeling Bad", a table is created in the storage unit 122, as shown in FIG. 8, to indicate whether to generate a group for each status. In addition, a step is added immediately after step S111 of the processing of the group management unit 104 in FIG. 4 to check if the notified changed status is defined in the table as a trigger status for generating a group. If the notified changed status is a status for generating a group, control is passed to step S112. If not, steps S112-S115 are skipped and control is passed directly to step S116. In this case, the identifier of the client X itself (sip:someone@example.com) is notified to the presentity 102, as indicated in FIG. 8 as "Address to be notified" instead of the group agent identifier, and the presentity 102 issues the identifier of the client X itself (sip:someone@example.com) and the status "Feeling Bad".

(Third variation): It is also possible to add a client Z, which is not monitoring the status of the client X, as a member by notifying the identifier of the generated group agent Xi to the client Z. However, a problem would be generated if an unspecified number of clients that are not monitoring the status of the client X are added as members without any limitation. Thus, as shown in FIG. 9, it is desirable that an access control unit 114 be provided in the group agent Xi for determining which client can be registered as a member and that the member management unit 112 add only those clients, allowed by the access control unit 114, as members. The access control unit 114 may comprise a storage unit which stores an accept list containing the identifiers of clients that will be accepted as members; and a determination unit that accepts the registration of a client, which sends an IM to the group agent Xi, if its identifier is included in the accept list but rejects the registration if the identifier is not included. Alternatively, the access control unit 114 may comprise a storage unit which stores a reject list containing the identifiers of clients that will be rejected as members; and a determination unit that accepts the registration of a client, which sends an IM to the group agent Xi, if its identifier is not included in the reject list but rejects the registration if the identifier is included.

(Fourth variation): In the first embodiment, a group agent is deleted from the IM&P service system only when the user explicitly deletes it. Instead, a group agent may be deleted automatically when the number of members of the group agent Xi is decreased to 1 again. This is accomplished by assigning a function to the member management unit 112 of the group agent. This function specifies the group agent as a user agent to be deleted and requests the server S to delete the user agent when the number of members, saved in the member list saving unit 1224, is once increased from the initialization value of 1 to a value of 2 or larger and, after that, is decreased to 1 again.

(Fifth variation): In the first embodiment, a group agent is deleted from the IM&P service system only when the user explicitly deletes it. Instead, a group agent may also be deleted automatically in the first variation when the number of members of the group agent Xi is decreased to 0. This is accomplished by assigning a function to the member management unit 112 of the group agent. This function specifies the group agent as a user agent to be deleted and requests the server S to delete the user agent when the control command in the first variation detects that the number of members, saved in the member list saving unit 1224, is decreased to 0.

(Sixth variation): When the IM delivery unit 111 of the group agent Xi transfers an IM, which is received by a group agent, to the members, the original sender, not the group agent Xi, can be used as the sender to disable anonymity. In this case, the information indicating that the IM was sent via the group agent Xi, if included in the routing information, could allow a user agent that receives the transferred IM to know that the received IM was transferred via the group agent Xi.

(Seventh variation): In the first embodiment, if clients a2 and a3, which are monitoring client a1, detect that client a1 enters a specific status and send an IM to a group agent A generated for that status, group a composed of members a1, a2, and a3 is generated. Similarly, if clients b2, which is monitoring client b1, detects that client b1 enters a specific status and sends an IM to a group agent B generated for that status, group b composed of members b1 and b2 is generated.

In this variation, a group agent has a presentity function that issues the status of the group agent via the presence service (server S) based on the information on the number of members managing the group agent, the number of IMs for which the group agent performs delivery processing, and other group information. In addition, a group agent has a watcher function to monitor the status of other group agents. In this configuration, if a client belonging to a group or the representative of the group sends an IM to a group agent of some other group, both groups are merged into one group for performing broadcasting within that group. For example, when an IM is sent from group b, which is growing in the number of members, to group a which is very active, the two groups are merged into one group.

(Eighth variation): It is also possible that a group agent issues a list of members, managed by the group agent, via the network to publicize the list of members belonging to the group. A list of members is issued by returning a list of members from a group agent to an IM sender who sends a particular command, by issuing a list of members via an information delivery server on the web, or by issuing a list of members from the presentity of the group agent Xi as in the seventh variation.

Second Embodiment

Figure 10:
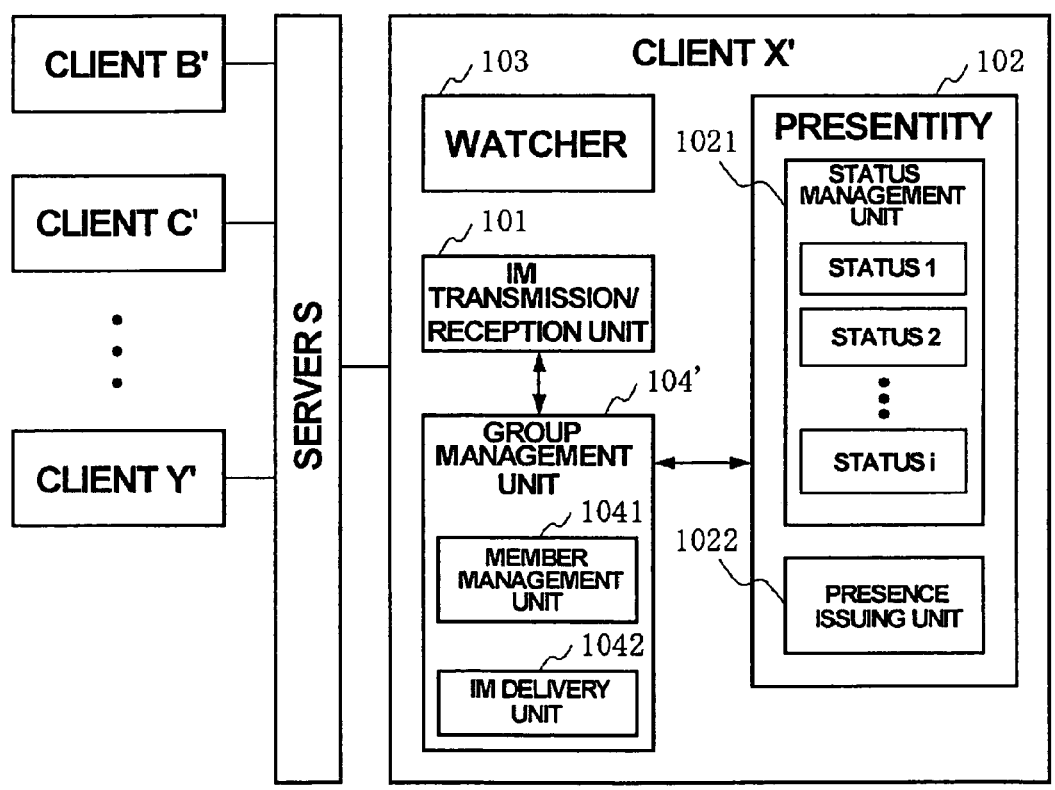
FIG. 10 is a block diagram showing the general configuration of a second embodiment of the present invention.

Referring to FIG. 10, a second embodiment of the present invention comprises a server S that operates as the server of the IM&P service system and client X', clients B', C', ..., and Y' each of which operates as a user agent of the IM&P service system. The server S and the user agents are connected each other for communication via a network such as the Internet not shown.

The client X' comprises an IM transmission/reception unit 101, a presentity 102, a watcher 103, and a group management unit 104'. The IM transmission/reception unit 101, the presentity 102, and the watcher 103 have the functions necessary for a user agent of the IM&P service system. The presentity 102 comprises a status management unit 1021 and a presence issuing unit 1022.

The group management unit 104', which corresponds to the group management unit 104 in the first embodiment to which the function of the group agents X1, X2, ..., Xi is added, comprises a member management unit 1041 and an IM delivery unit 1042.

The member management unit 1041 has a function for monitoring the status of the presentity 102 and, when the status is changed, for generating a group corresponding to the changed status; and a function for managing the list of members belonging to a group and for communicating with other members of a group to synchronize (match) the member lists.

The IM delivery unit 1042 sends an IM, which is sent to a group, to all members managed by the member management unit 1041 via the IM transmission/reception unit 101.

In this embodiment, all other clients B', C', ..., Y' participating in a group has the same configuration as that of the client X'.

The server S, which works as the server of the IM&P service system, has the IM delivery function for delivering an IM among user agents and the notification function for notifying presence information.

The hardware of the clients X', B', C', ..., and Y' can have the same configuration as that of the first embodiment such as the one shown in FIG. 2. In this case, each functional unit of a client,—that is, the IM transmission/reception unit 101, the presentity 102, watcher 103, and the group management unit 104'—comprises a CPU constituting the control unit 125 and the programs stored in the storage unit 122.

The hardware of the server S can have the same configuration as that of the first embodiment such as the one shown in FIG. 3. In this case, each function of the server S is executed by a CPU constituting the control unit 133 and the programs stored in the storage unit 132.

Figure 11:
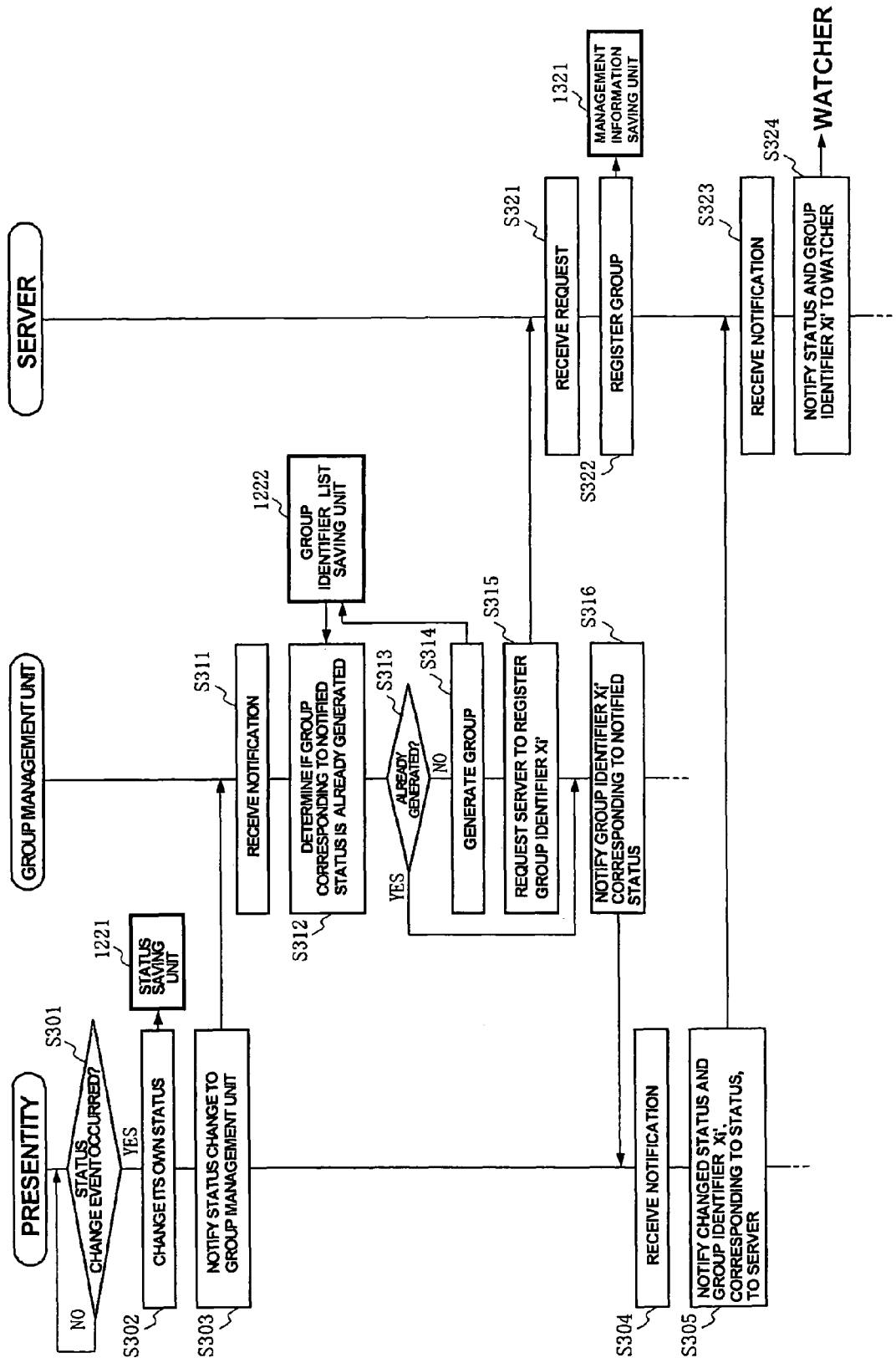
FIG. 11 is a flowchart showing an example of processing of the components in the second embodiment of the present invention.
Figure 12:
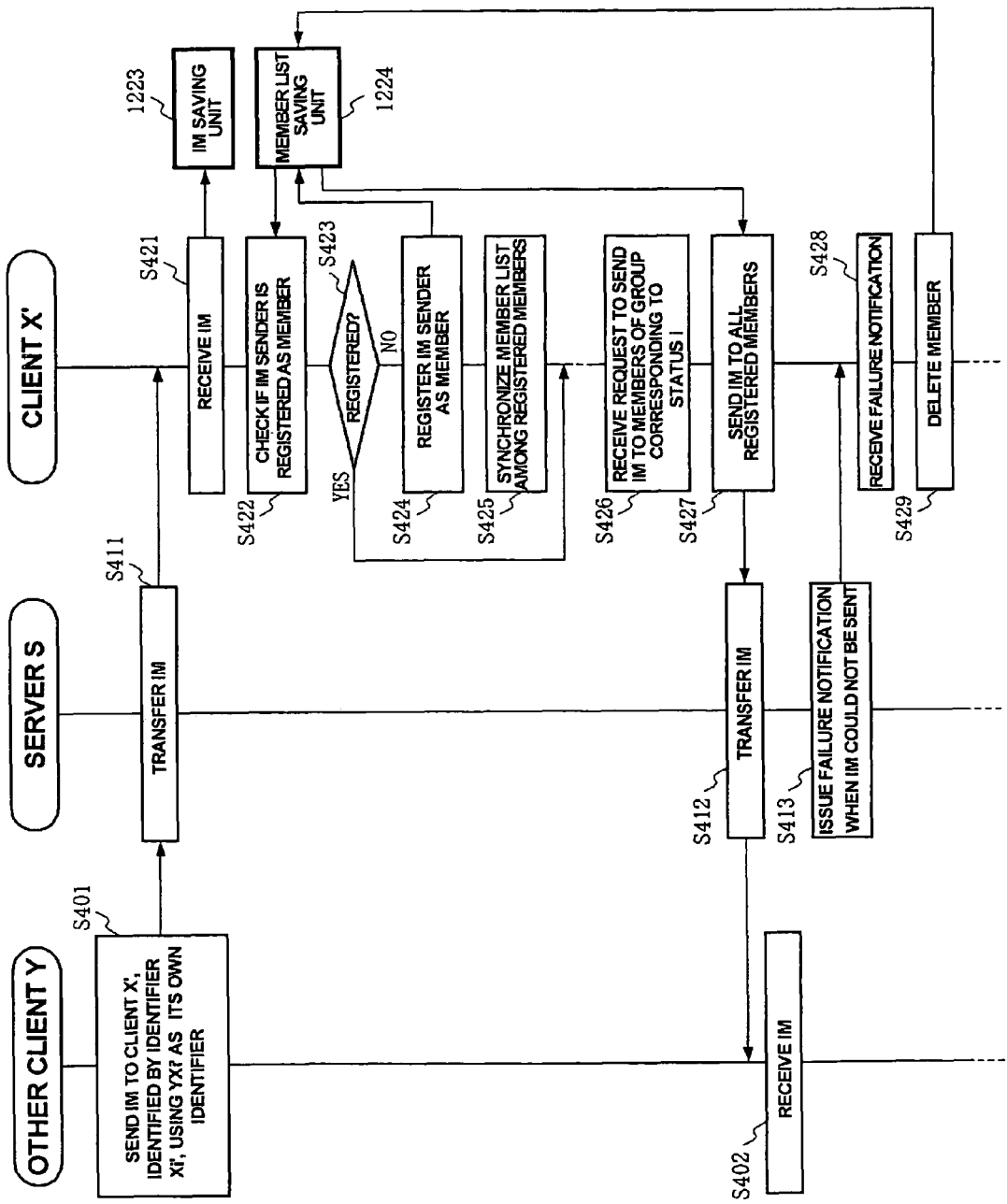
FIG. 12 is a flowchart showing an example of processing of the components in the second embodiment of the present invention.

FIG. 11 and FIG. 12 are flowcharts showing an example of processing of the components in this embodiment. Referring to FIG. 11, the presentity 102 of the client X' determines if a status change event occurs (S301) and, if such an event occurs, updates the status saving unit 1221 provided in the storage unit 122 for saving its current status in the status saving unit 1221 (S302). An example of a status change event is a status change request entered by the user of the client X' from the input unit 123. Then, the presentity 102 notifies a status change notification, which includes the changed status (status i), to the group management unit 104' (S303).

In response to the status change notification from the presentity 102 (S311), the group management unit 104' references a group identifier list saving unit 1222 in the storage unit 122, in which the list of generated group identifiers is saved, to determine if the group corresponding to the changed status i is already generated (S312). If not (NO in S313), the group management unit 104' generates a group corresponding to the changed status and saves the identifier Xi' of the generated group into the group identifier list saving unit 1222 (S314). The group identifier Xi', for example, a sip address, is an identifier used to contact the client X' in the status i. Then, the group management unit 104' requests the server S to register the generated group identifier Xi' and the corresponding communication address (for example, IP address) (S315).

In response to the request to register the group identifier Xi' and the communication address from the group management unit 104' (S321), the server S registers the correspondence between the group identifier Xi' and the communication address into a management information saving unit 1321 provided in the storage unit 132 (S322). The management information saving unit 1321 contains the correspondence between the identifiers and the communication addresses of the already registered groups such as clients X' and clients B', C', ..., Y'.

If the group corresponding to the changed status i is already generated (YES in S313) or after the group not yet registered is newly generated (S314), the group management unit 104' notifies the group identifier Xi', corresponding to the changed status i, to the presentity 102 (S316). In response to this notification (S304), the presentity 102 notifies the changed status i and the group identifier Xi', corresponding to the changed status i, to the server S as presence information (S305).

In response to the changed status i and the group identifier Xi', corresponding to the status i, from the presentity 102 of the client X' (S323), the server S notifies the received changed status i of the presentity 102 and the group identifier Xi', used to contact the client X' in that status i, to the watchers of the other clients that are monitoring the presence of the client X' (S324).

Referring to FIG. 12, when an IM whose destination is the group identifier X' is received from some other client (in this example, client Y)(S401), the server S transfers the IM to the client X' identified by the group identifier X' (S411). When sending an IM to the client X' in the status i, the client Y uses Yxi' as its identifier. The identifier Yxi' is, for example, a sip address, and the communication address (for example, IP address) corresponding to the sip address is registered in the management information saving unit 1321 of the server S.

The client X' uses the IM delivery unit 111 to save the received IM into the IM saving unit 1223 in the storage unit 122 (S421), and uses the member management unit 1041 of the group management unit 104' to reference the member list saving unit 1224 in the storage unit 122, in which the member list is saved, to check if the sender of the IM identified by Yxi' is registered as a member (S422). If the sender of the IM is not yet registered (NO in S423), the member management unit 1041 registers the sender of the IM, identified by Yxi', into the member list saving unit 1224 (S424). The member management unit 1041 sends and receives a control message, via the IM transmission/reception unit 101, to and from all members included in the member list saved in the member list saving unit 1224 in order to synchronize the member list among them by exchanging the list of members belonging to the group corresponding to the status i (S425).

After that, when the client X' receives a request from the user to send an IM to the members of the group corresponding to the status I (S426), the IM delivery unit 1042 of the group management unit 104' sends the IM via the IM transmission/reception unit 101 to all members of the group corresponding to the status i saved in the member list saving unit 1224 (S427). At this time, the identifier Yxi' of the client Y' belonging to the group corresponding to the status i is used as the destination of the IM to the client Y'. The server S transfers the IM, sent from the client X', to the clients (S412, S402). For example, the IM having the destination identified by the identifier Yxi' is transferred to the client Y'.

If one of the clients is offline and the IM could not be sent, the server S returns a failure notification to the client X', from which the IM was sent, including the information on the client to which the IM could not be sent (S413). In response to this failure notification (S428), the client X' uses the member management unit 1041 to delete the information on the client, to which the IM could not be sent, from the member list saving unit 1224 and remove the client from the members of the group (S429).

If each client belongs to one group at a time, the two identifiers of the client X', that is, the identifier X' and the identifier Xi' corresponding to the status i, may be the same and, similarly, the two identifiers of client Y', that is, the identifier Y' and the identifier Yxi', may be the same.

With reference to FIGS. 10-12, the following describes the operation of this embodiment.

(1) Suppose that the presentity 102 of the client X' changed its own status, stored in the status management unit 1021, to the status i (S302).

(2) The group management unit 104' of the client X' adds the group, corresponding to the status i of the changed presentity 102, to the member management unit 1041 of the group management unit 104' (S314). A identifier Xi' unique in the presence service is assigned to this group.

(3) The presence issuing unit 1022 of the presentity 102 of the client X' combines the status i stored in the status management unit 1021 with the identifier Xi' used to contact the client X' having the status i and issues this combination of the status and the identifier to the presence service (server S) (S305).

(4) The clients B', C', . . . , Y', which are monitoring the status of the client X', receive the status i of the client X' and the identifier Xi', used to contact the client X' having the status i, via the server S (S324).

(5) After that, suppose that the client Y', which receives the status i of the client X' and the identifier Xi', sends an IM to the client X' identified by the identifier Xi' (S401). At this time, the client Y' uses Yxi' as its identifier.

(6) In response to the IM addressed to the identifier Xi', the client X' adds the IM sender identified by Yxi' to the members of the group corresponding to the status i managed by the member management unit 1041 (S424). The member management unit 1041 synchronizes the new group list among all members of the group corresponding to the status i (S425). As a result, the same group list as that stored in the member management unit 1041 of the client X' is generated also in the member management unit 1041 of the client Y'.

(7) After that, suppose that the user of the client X' requests the group management unit 104' to send an IM to the members of the group corresponding to the status i (S426).

(8) The IM delivery unit 1042 of the group management unit 104 of the client X' sends the IM to all members, managed by the member management unit 1041, via the IM transmission/reception unit 101. If the server S notifies that there is a client to which the IM could not be sent, the member management unit 1041 of the client X' deletes the client from the members maintained by the member management unit 1041.

(9) Steps (5)-(8) are repeated. When the client Y' withdraws from the IM&P service system during the processing, the client Y' is deleted in step (8) from the members of the group corresponding to the status i of the client X'.

(10) The group corresponding to the status i of the client X' remains in the system until the synchronized member list has no member.

As described above, a group of members having a common topic can be created easily in the second embodiment of the present invention. The reason is that a group of members having an interest in a specific topic is generated by allowing a watcher having an interest in the specific status to send an IM to a group corresponding to a specific status i, which is issued by the presentity 102 of the client X', and including the watcher into the group.

A user who is not participating in a group can participate voluntarily into the group. The reason is that, when the presentity 102 enters a specific status, a user watching the status of the presentity 102 receives the status and the group identifier and finds that there is the group. This allows the user to indicate his or her intention to participate into the group without being invited by a user already participating in the group.

The second embodiment eliminates the need for group agents such as those used in the first embodiment.

The first to eighth variations in the first embodiment are also applicable to the second embodiment of the present invention.

Third Embodiment

This embodiment differs from the first embodiment in that a plurality of clients with the same presentity status are grouped.

The general configuration of this embodiment is the same as that of the first embodiment. As shown in FIG. 1, this embodiment comprises a server S that operates as a server in an IM&P service system; and a client X, group agents X1-Xi, and clients B, C, . . . , Y each of which operates as a user agent of the IM&P service system. The server S and each user agent are interconnected via a network such as the Internet, not shown, for communication between them.

The client X comprises an IM transmission/reception unit 101, a presentity 102, a watcher 103, and a group management unit 104. The IM transmission/reception unit 101, the presentity 102, and the watcher 103 each have functions necessary for a user agent of the IM&P service system. The presentity 102 has a status management unit 1021 and a presence issuing unit 1022.

The group management unit 104 monitors the status of the presentity 102 and, upon detecting that the status is changed, inquires of the watcher 103 as to whether some other client, which is being monitored by the client X, has the status i that is the same as the changed status (this status is i). If there is no other client that is being monitored by the client X and has the status i, the group management unit 104 registers a group agent, corresponding to the changed status, into the server S as a user agent of the IM&P service system. The group agents X1, X2, ..., Xi shown in FIG. 1, which are registered in this way, correspond one-to-one to status 1, status 2, and status i. If there is some other client that is being monitored by the client X and has a status that is the same as the changed status i, the group management unit 104 sends a control command to a group agent, generated by the client, to request participation into that group.

The group agent Xi comprises an IM delivery unit 111 and a member management unit 112. The member management unit 112 manages the members belonging to the group Xi. In response to the above-described control command addressed to the group Xi, the IM delivery unit 111 adds the sender of the control command to the member management unit 112 as a member and, in response to an IM addressed to the group Xi, sends the received IM to all members managed by the member management unit 112. Other group agents X1, X2, and so on also have the same configuration as that of the group agent Xi. The group agents X1, X2, ..., Xi may be physically located in the terminal in which the client X is located or in some other terminal in the IM&P service system.

The other clients B, C, ..., Y have the same configuration as that of the client X.

The server S, the server of the IM&P service system, has the function to deliver an IM between user agents and a function to notify presence information. Because group agents X1, X2, ..., Xi, each of which has the IM delivery unit 111, are also user agents, the server S subtracts the network address of a group agent from the group agent identifier to deliver a message to the group agent.

The hardware of the clients X, B, C, ..., and Y can be configured in the same way as that of the first embodiment, for example, as shown in FIG. 2. In this case, each functional unit—that is, the IM transmission/reception unit 101, the presentity 102, the watcher 103, and the group management unit 104—comprises the CPU constituting the control unit 125 and the programs stored in the storage unit 122.

The hardware of the server S can be configured in the same way as that of the first embodiment, for example, as shown in FIG. 3. The functions of the server S are implemented by the CPU constituting the control unit 133 and the programs stored in the storage unit 132.

Figure 13:
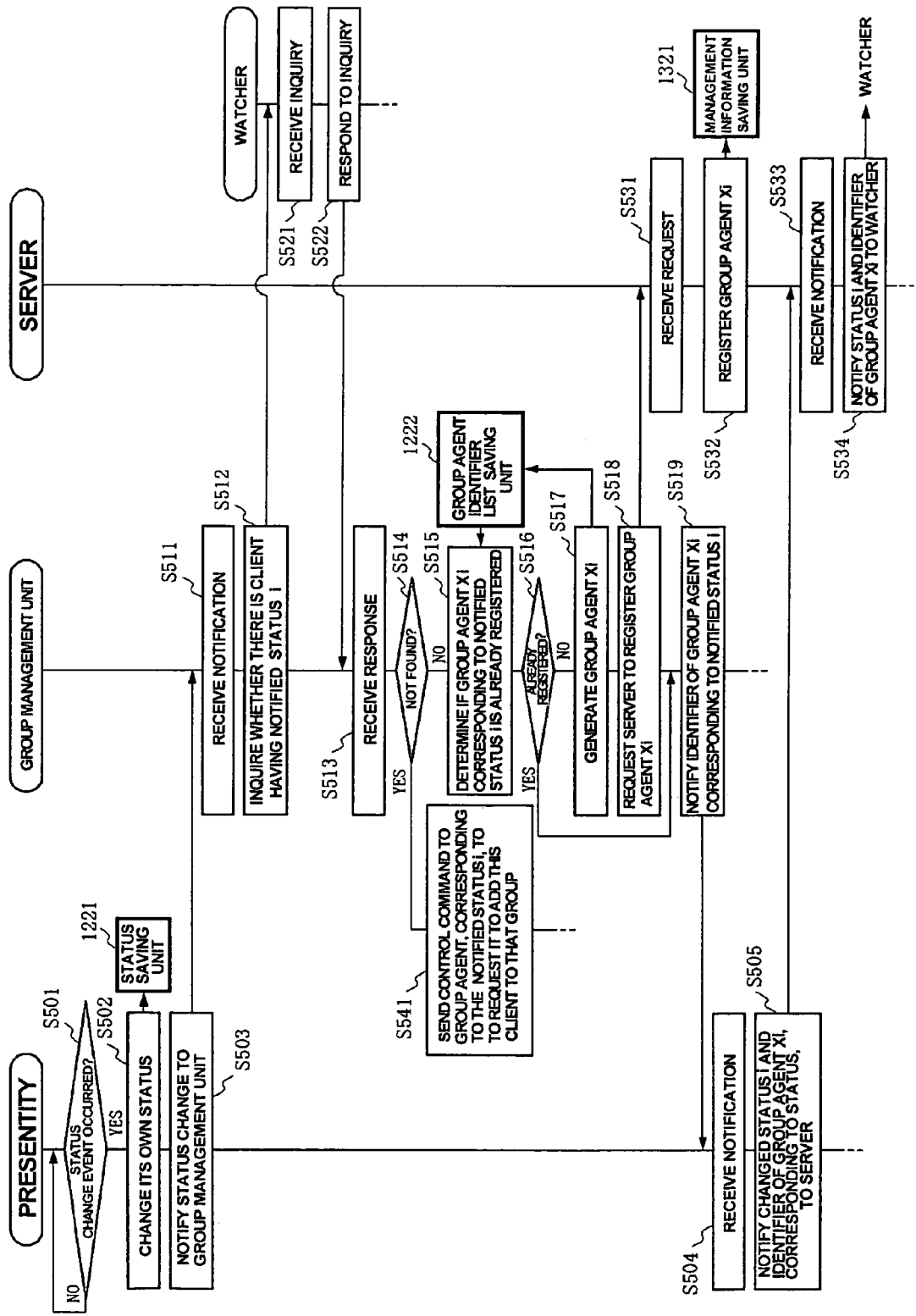
FIG. 13 is a flowchart showing an example of processing of the components in a third embodiment of the present invention.
Figure 14:
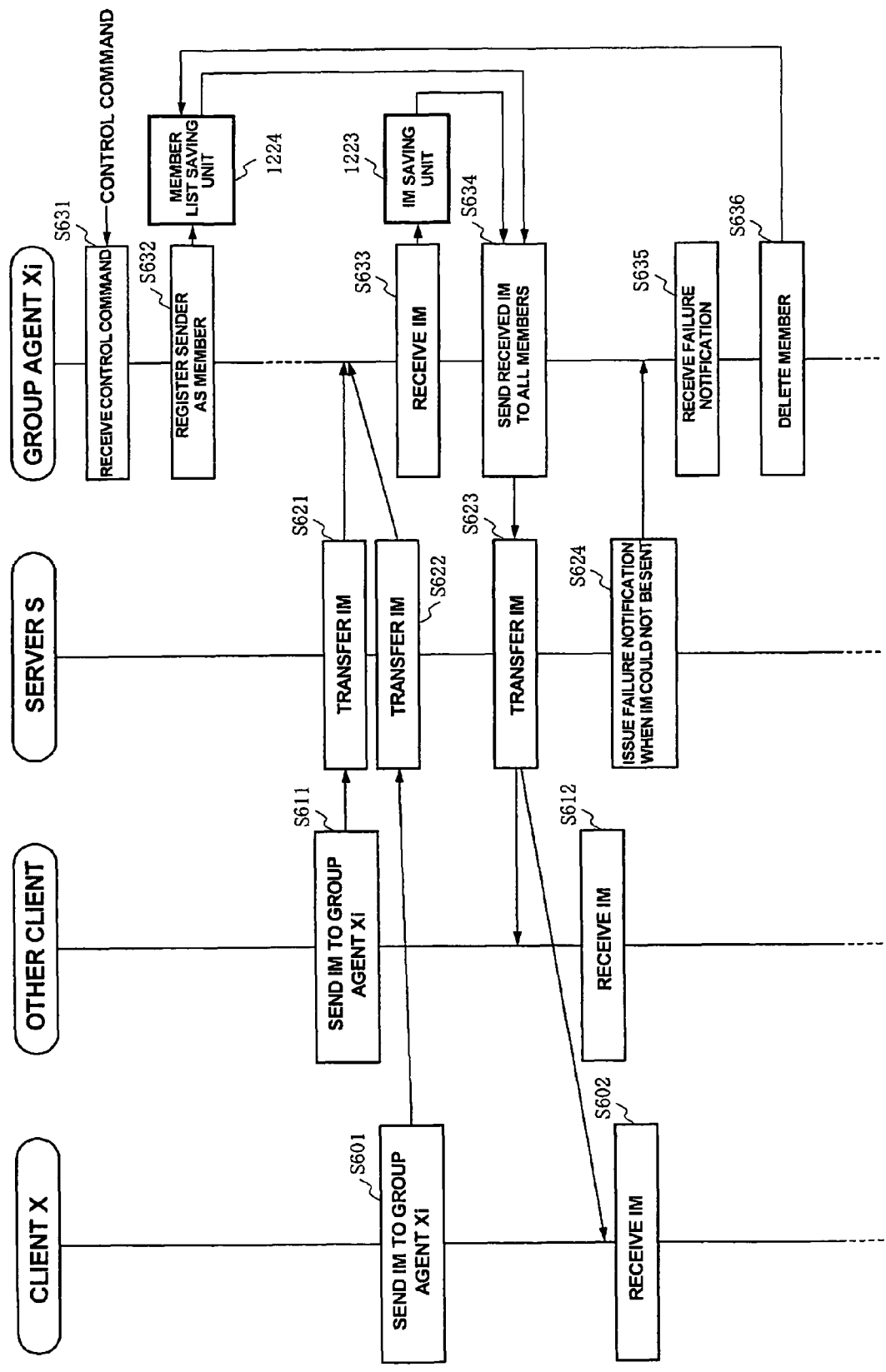
FIG. 14 is a flowchart showing an example of processing of the components in the third embodiment of the present invention.

FIGS. 13 and 14 are flowcharts showing an example of processing of the components in this embodiment. Referring to FIG. 13, the presentity 102 of the client X determines if a status change event occurred (S501) and, if such an event occurred, updates a status saving unit 1221, provided in the storage unit 122, for saving its current status (status i) in the status saving unit 1221 (S502). An example of status change events is a status change request entered by the user of the client X from the input unit 123. The presentity 102 sends a status change notification, which includes the changed status i, to the group management unit 104 (S503).

In response to a status change notification from the presentity 102 (S511), the group management unit 104 inquires of the watcher 103 of its client as to whether some other client monitoring the client X has the same status i (S512). Upon receiving this inquiry (S521), the watcher 103 searches the other clients, which are being monitored by this client, for a client having the same status i. If no such client is found, the watcher 103 returns information indicating the condition; if such a client is found, the watcher 103 returns information indicating the condition and the identifier of the group agent generated by the client corresponding to the status i (S522).

The group management unit 104 receives the response from the watcher 103 (S513). If there is no other client that is monitored by the client X and that has the status i (NO in S514), the group management unit 104 references the group agent identifier list saving unit 1222 in the storage unit 122 in which the list of identifiers of registered group agents is saved and determines whether the group agent corresponding to the status i is already registered (S515). If no such group agent is yet registered (NO in S516), the group management unit 104 generates a group agent corresponding to the status i and saves the identifier (Xi) of the generated group agent into the group identifier list saving unit 1222 (S517). Then, the group management unit 104 uses the communication unit 121 to connect to the server S and sends a group agent registration request, including the generated group agent identifier Xi (for example, sip address) and the communication address (for example, IP address), to the server S (S518).

In response to the group agent registration request, which includes the group agent identifier and the communication address, from the group management unit 104 (S531), the server S registers the correspondence between the group agent identifier and the communication address into the management information saving unit 1321 provided in the storage unit 132 (S532). The management information saving unit 1321 contains the correspondence between the user agents, such as the client X, the clients B, C, ..., Y, and the communication addresses.

If the group agent corresponding to the status i is already registered (YES in S516) or after the group agent not yet registered is newly registered (S518), the group management unit 104 notifies the group agent identifier Xi, corresponding to the status i, to the presentity 102 (S519). In response to this notification (S504), the presentity 102 notifies the changed status i and the group agent identifier Xi, corresponding to the status, to the server S as presence information (S505).

In response to the changed status i and the group agent identifier Xi, corresponding to the status, from the presentity 102 of the client X (S533), the server S notifies the received changed status i of the presentity 102 and the group agent identifier Xi, corresponding to the status, to the watchers of the other clients that are monitoring the presence of the client X (S534). The other client watchers save the received status i of the client X and the group agent identifier Xi corresponding to the status i into the memory for responding to an inquiry that will be issued.

On the other hand, if the response from the watcher 103 indicates that some other client being monitored by the client X has the same status i (YES in S514), the group management unit 104 sends a control command to the group agent, identified by the group agent identifier corresponding to the status i notified by the watcher 103 at response time, to request it to add the client X as a member (S541).

Referring to FIG. 14, in response to a control command from a client requesting that the client be added to the members of the group (S631), the group agent Xi adds the sender of the control command to the member list saving unit 1224, managed by the member management unit 112, as a member (S632).

Upon receiving an IM, whose destination is the group agent identifier of the group agent Xi, from other clients such as the client X and the client B (S601, S611), the server S transfers the IM to the group agent Xi having the communication address corresponding to the group agent identifier (S621, S622).

The group agent Xi receives this IM via the IM delivery unit 111 and saves it into the IM saving unit 1223 of the storage unit 122 (S633). The group agent Xi uses the IM delivery unit 111 to reference the member list saving unit 1224 for sending the received IM to all members (S634). At this time, it is possible not to send the received IM to the IM sender.

The IM sent from the group agent Xi is relayed by the server S (S623) and is received by the destinations of the IM, that is, client X and other clients (S602, S612). If any of the clients is offline and thus the IM could not be sent, the server S sends a failure notification, including information on the client to which the IM could not be sent, to the group agent Xi that is the sender (S624). Upon receiving this failure notification (S635), the group agent Xi uses the member management unit 112 to delete the information on the client, to which the IM could not be sent, from the member list saving unit 1224 to remove the client from the members of the group (S636).

The following describes the operation of this embodiment with reference to FIG. 1 and FIGS. 13-14.

(1) Suppose that there is no user agent that has the status i in the IM&P service system.

(2) Under this situation, suppose that the client X changed its status to i (S502). The group management unit 104 inquires of the watcher 103 of the client X as to whether there is some other client that is being monitored by the client X and has the status i (S513).

(3) At this time, because there is no other client that is being monitored by the client X and has the status i, the group management unit 104 registers the group agent Xi in the IM&P service system (server S) (S518).

(4) The client X notifies the status i and the group agent identifier Xi to the clients (client Y and client Z), which are monitoring the client X, via the server S (S505, S534).

(5) After that, suppose that the client Y changed its status to i (S502). The status management unit 1021 of the client Y inquires of the watcher 103 of the client Y as to whether there is some other client that is being monitored by the client Y and has the status i.

(6) At this time, because the client X being monitored by the client Y has the status i, the group management unit 104 of the client Y sends a control command to the group agent Xi, identified by the identifier Xi notified by the watcher 103 at the same time the status i of the client X was notified, to request that the client Y be added to the group of the group agent Xi (S541).

(7) Similarly, when the client Z changed its status to i, the client Z is added to the members of the group agent Xi.

(8) After that, when the client Y that is registered as a member of the group agent Xi sends an IM to the group agent Xi (S611), the IM is sent to the members of the group agent Xi, that is, to the client X, the client Y, and the client Z (S634).

As described above, a group of members having a common topic can be created easily in the third embodiment of the present invention. The reason is that a plurality of clients having the same presentity status are grouped into one.

In addition, a user who is not participating in a group can participate voluntarily into the group. The reason is that, when the presentity 102 enters a specific status, a user watching the status of the presentity 102 receives the status and the group identifier and finds that there is the group. This allows the user to indicate his or her intention to participate into the group without being invited by a user already participating in the group.

The first to eighth variations in the first embodiment are also applicable to the third embodiment of the present invention. The following variations are also applicable.

(First variation): In the third embodiment, a client that will be registered in a group agent must monitor another client that is already a member of the group agent. In this first variation, the group management unit 104 is provided in the server S of the IM&P service system, not in each client. In this configuration, any clients with the same status can be grouped into one.

In this case, the presence of a group must be notified to a subset of clients of the IM&P service system (hereinafter simply called a system in the description of this variation). When a list indicating which client is monitoring which other clients (hereinafter called a buddy list in the description of this variation) is managed by the server S, the server S adds a generated group agent to a buddy list of clients to which a notification is to be sent. Alternatively, the group agents or the group agents and their member lists may be issued by an information issuing server on the web.

(Second variation): In the third embodiment and the first variation described above, clients are grouped into one only when they have exactly the same status. In the second variation, clients are grouped into one when they have statuses satisfying a specific predetermined relation. For example, when statuses are classified into several sets according to the types, clients having the statuses belonging to the same set are grouped into one. More specifically, if there are three statuses—"Feeling Good", "Feeling Bad", and "Happy"—and if "Feeling Good" and "Happy" are classified into the same status, the clients having the status "Feeling Good" and the clients having the status "Happy" are grouped into one.

Although the embodiments of the present invention have been described, the present invention is not limited to the embodiments described above. Several other functions may be added, and modifications may be made, to the present invention, and the present invention may be used in various types of field. For example, the present invention is applicable to a group of friends. If the status "want to play" is issued, it is possible for friends reacting to that status to form a group and to select a place where they will actually get together. Two or more items of a presentity can also be used as a trigger for forming a group. For example, it is possible to use position information as the status in addition to the status "want to play", and to add only those persons, who are geographically near (the same status type) and "want to play", to a group. A plurality of generated groups may also belong to another larger group. Another application is found in group learning. For example, a student issues statuses, such as "do not understand XX" and "want to know YY", as the statuses of the student; then, the students reacting to the statuses can voluntarily start group learning. Because a client can participate in two or more groups, a teacher can belong to two groups, that is, a group formed by teachers having the same problem and another group formed by the students in his or her charge. This helps to build an environment in which an efficient leaning guidance is received.

What is claimed is:

1. A group communication system based on presence information for use in an instant message and presence service system that sends and receives presence information and an instant message among a plurality of client devices each comprising a presentity that provides presence information; a watcher that observes presence information on presentities other than said presentity; and an IM (Instant Message) transmission/reception unit that sends and receives an instant message, wherein
   at least one client device of said plurality of client devices comprises:
   a processor for implementing the functions of the client device;
   a group management unit that, when presence information provided by the presentity of said one client device changes to a specific status, determines whether a group agent corresponding to the specific status of the client already exist, and if the group agent corresponding to the specific status of the client already exists, sends a control command to that group agent device to request that the client be added as a member to the group agent device, otherwise the group management unit generates a group agent device corresponding to the specific status of the client; and
   a presence issuing unit that issues the specific status and an identifier used to contact said generated group agent device; and
   wherein said group agent device comprises:
   a member management unit that manages, as members thereof, at least said client device that generated said group agent device and a client device that sends an instant message to said group agent device; and
   an IM delivery unit that transfers an instant message, which is sent to said group agent device, to all client devices that are members managed by said member management unit except at least the sender of the instant message.

2. The group communication system based on presence information according to claim 1, wherein said group agent device further comprises a control message processing unit that, when a control message including a specific control command is received, deletes the sender of the control message from the members managed by said member management unit.

3. The group communication system based on presence information according to claim 1, wherein, when presence information provided by the presentity of said client device changes to a specific status, said group management unit registers a group agent device corresponding to the status into the system, only when the changed status is defined in a control table as a trigger status for generating a group.

4. The group communication system based on presence information according to claim 1, wherein said presence issuing unit comprises means for notifying the specific status and the identifier used to contact said generated group agent device to client devices, except the client device monitoring the status of the client device; and
   wherein said group agent device further comprises an access control unit that manages whether a client device from which an instant message is received is to be added to the members.

5. The group communication system based on presence information according to claim 1, wherein, when the number of members managed by said member management unit falls below a predetermined number, said group agent device deletes said group agent device itself from the system.

6. The group communication system based on presence information according to claim 1, wherein the IM delivery unit of said group agent device does not change the sender to said group agent device but uses an original sender as the sender when transferring the received instant message to the members.

7. The group communication system based on presence information according to claim 1, wherein said group agent device further comprises a presentity that issues information on said group agent device.

8. The group communication system based on presence information according to claim 1, wherein said group agent device issues a list of members, which are managed by said member management unit, via a network.

9. A group communication system based on presence information for use in an instant message and presence service system that sends and receives presence information and an instant message among a plurality of client devices each comprising a presentity that provides presence information; a watcher that observes presence information on presentities other than said presentity; and an IM transmission/reception unit that sends and receives an instant message,
   wherein said client device comprises:
   a processor for implementing the functions of the client device;
   a group management unit that, when presence information provided by the presentity of said client device changes to a specific status, determines whether a group agent corresponding to the specific status of the client already exists, and if the group agent corresponding to the specific status of the client already exists, sends a control command to that group agent device to request that the client be added as a member to the group agent device, otherwise the group management unit generates a group agent device corresponding to the specific status of the client; and
   a presence issuing unit for issuing the specific status and an identifier used to contact the generated group; and
   wherein said group management unit comprises:
   a member management unit that manages, as members thereof, at least said client device that generated the group and a client device that sends an instant message to the group and, at the same time, synchronizes all members and a member list; and
   an IM delivery unit that transfers an instant message, which is sent to said group, to all client devices that are members managed by said member management unit except at least the sender of the instant message.

10. The group communication system based on presence information according to claim 9, wherein said client device further comprises
    a control message processing unit that, when a control message including a specific control command is received, deletes the sender of the control message from the members managed by said member management unit.

11. The group communication system based on presence information according to claim 10, wherein, when presence information provided by the presentity of the client device changes to the specific status, said group management unit generates a group corresponding to the status only when the changed status is defined in a control table as a trigger status for generating a group.

12. The group communication system based on presence information according to claim 9, wherein said presence issuing unit comprises means for notifying the specific status and the identifier used to contact said generated group to client devices, except the client device, that are monitoring the client device; and wherein said group management device further comprises an access control unit that manages whether a client device from which an instant message is received is to be added to the members.

13. The group communication system based on presence information according to claim 9, wherein, when the number of members of a group managed by said member management unit falls below a predetermined number, said client device deletes said group.

14. The group communication system based on presence information according to claim 9, wherein said group management unit issues a list of members, which are managed by said member management unit, via a network.

15. A group communication system based on presence information for use in an instant message and presence service system that sends and receives presence information and an instant message among a plurality of client devices each comprising a presentity that provides presence information; a watcher that observes presence information on presentities other than said presentity; and an IM transmission/reception unit that sends and receives an instant message, wherein each of said plurality of client devices further comprises:

a processor for implementing the functions of the client device;

a group management unit that, when presence information provided by the presentity of said client device changes to a specific status, determines whether a group agent corresponding to the specific status of the client already exists, and if the group agent corresponding to the specific status of the client already exists, sends a control command to that group agent device to request that the client be added as a member to the group agent device, otherwise the group management unit generates a group agent device corresponding to the specific status of the client; and a presence issuing unit that issues the specific status and an identifier used to contact said generated group agent device; and wherein said group agent device comprises:

a member management unit that manages, as members thereof, at least said client device that generated said group agent device and a client device that sends the control command to said group agent device; and an IM delivery unit that transfers an instant message, which is sent to said group agent device, to all client devices that are members managed by said member management unit except at least the sender of the instant message.

16. A group communication system based on presence information for use in an instant message and presence service system that sends and receives presence information and an instant message among a plurality of client devices each comprising a presentity that provides presence information; a watcher that observes presence information on presentities other than said presentity; and an IM transmission/reception unit that sends and receives an instant message, wherein each of said plurality of client devices further comprises:

a processor for implementing the functions of the client device;

a group management unit that, when presence information provided by the presentity of said client device changes to a specific status, determines whether a group agent corresponding to the specific status or a status having a particular relation with the specific status of the client already exists, and if the group agent corresponding to the specific status or a status having a particular relation with the specific status of the client already exists, sends a control command to that group agent device to request that the client be added as a member to the group agent device, otherwise the group management unit generates a group agent device corresponding to the specific status of the client; and a presence issuing unit that issues the specific status and an identifier used to contact said generated group agent device; and wherein said group agent device comprises:

a member management unit that manages, as members thereof, at least said client device that generated said group agent device and a client device that sends the control command to said group agent device; and an IM delivery unit that transfers an instant message, which is sent to said group agent device, to all client devices that are members managed by said member management unit except at least the sender of the instant message.

17. A client device including: a presentity that provides presence information; a watcher that observes presence information on presentities other than said presentity; and an IM transmission/reception unit that sends and receives an instant message, said client device further comprising:

a processor for implementing the functions of the client device;

a group management unit that, when presence information provided by the presentity of said client device changes to a specific status, determines whether a group agent corresponding to the specific status of the client already exists, and if the group agent corresponding to the specific status of the client already exists, sends a control command to that group agent device to request that the client be added as a member to the group agent device, otherwise the group management unit generates a group agent device corresponding to the specific status of the client; and a presence issuing unit that issues the specific status and an identifier used to contact said generated group agent device;

wherein said group agent device comprises:

a member management unit that manages, as members thereof, at least said client device that generated said group agent device and a client device that sends an instant message to said group agent device; and an IM delivery unit that transfers an instant message, which is sent to said group agent device, to all client devices that are members managed by said member management unit except at least the sender of the instant message.

18. A client device including: a presentity that provides presence information; a watcher that observes presence information on presentities other than said presentity; and an IM transmission/reception unit that sends and receives an instant message, said client device further comprising:
- a processor for implementing the functions of the client device;
- a group management unit that, when presence information provided by the presentity of said client device changes to a specific status, determines whether a group agent corresponding to the specific status of the client already exists, and if the group agent corresponding to the specific status of the client already exists, sends a control command to that group agent device to request that the client be added as a member to the group agent device, otherwise the group management unit generates a group agent device corresponding to the specific status of the client; and
- a presence issuing unit that issues the specific status and an identifier used to contact said generated group;
- wherein said group management unit comprises:
- a member management unit that manages, as members thereof, at least said client device that generated the group and a client device that sends an instant message to the group and, at the same time, synchronizes all members and a member list; and
- an IM delivery unit that transfers an instant message, which is sent to said group, to all client devices that are members managed by said member management unit except at least the sender of the instant message.

19. A client device including: a presentity that provides presence information; a watcher that observes presence information on presentities other than said presentity; and an IM transmission/reception unit that sends and receives an instant message, said client device further comprising:
- a processor for implementing the functions of the client device;
- a group management unit that, when presence information provided by the presentity of said client device changes to a specific status, determines whether a client having the same status already exists, and if a client having the same status already exists, sends a control command to that group agent device to request that the client be added as a member to the group agent device, otherwise the group management unit generates a group agent device corresponding to the specific status of the client; and
- a presence issuing unit that issues the specific status and an identifier used to contact said generated group agent device;
- wherein said group agent device comprises:
- a member management unit that manages, as members thereof, at least said client device that generated said group agent device and a client device that sends the control command to said group agent device; and
- an IM delivery unit that transfers an instant message, which is sent to said group agent device, to all client devices that are members managed by said member management unit except at least the sender of the instant message.

20. A client device including: a presentity that provides presence information; a watcher that observes presence information on presentities other than said presentity; and an IM transmission/reception unit that sends and receives an instant message, said client device further comprising:
- a processor for implementing the functions of the client device;
- a group management unit that, when presence information provided by the presentity of said client device changes to a specific status, determines whether a client having the same status or a status having a particular relation with the specific status already exists, and if a client having the same status or a status having a particular relation with the specific status already exists, sends a control command to that group agent device to request that the client be added as a member to the group agent device, otherwise the group management unit generates a group agent device corresponding to the specific status of the client; and
- a presence issuing unit that issues the specific status and an identifier used to contact said generated group agent device;
- wherein said group agent device comprises:
- a member management unit that manages, as members thereof, at least said client device that generated said group agent device and a client device that sends the control command to this group agent device; and
- an IM delivery unit that transfers an instant message, which is sent to this group agent device, to all client devices that are members managed by said member management unit except at least the sender of the instant message.

21. A communication method for sending and receiving an Instant Message among a plurality of client devices via a network, comprising:
- monitoring the status of a client;
- if the client status changes, determining whether a group agent corresponding to the changed status is already registered, registering the client as a member of an existing group agent corresponding to the changed status of the client, and updating the client with a group agent identifier;
- notifying a server of the changed status of the client and the group agent identifier, wherein the server notifies a watcher monitoring the status of the client of the changed status of the client and the group agent identifier; and
- managing clients corresponding to the group agent;
- wherein clients registered with the group agent may communicate with each other through the group agent using Instant Messages.

22. The communication method of claim 21, further comprising, checking whether the Instant Message sender is a member of the group agent, and adding the Instant Message sender to the group agent member list if the Instant Message sender is not a member.

23. The communication method of claim 21, wherein an instant message is delivered to all members of the group agent.

24. The communication method of claim 21, further comprising, determining whether a group agent corresponding to the changed status is already registered, registering the client as a member of the existing group agent corresponding to the changed status of the client, and updating the client with the group agent identifier.

* * * * *